Figure 1:
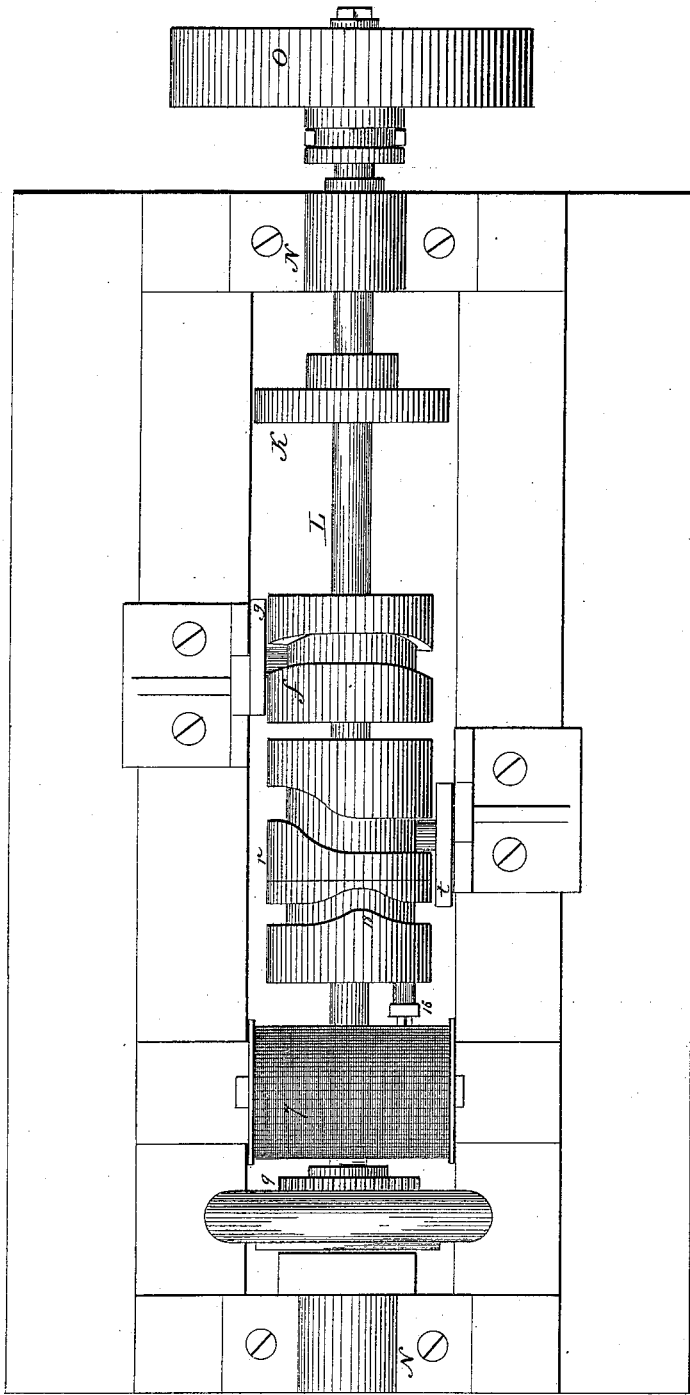

(No Model.)  5 Sheets—Sheet 1.

A. FRAZIER.
MACHINE FOR MAKING BRUSHES.

No. 330,688.  Patented Nov. 17, 1885.

Witnesses.  
Alexander Frazier  
Inventor (No Model.) 5 Sheets—Sheet 2.
A. FRAZIER.
MACHINE FOR MAKING BRUSHES.
No. 330,688. Patented Nov. 17, 1885.
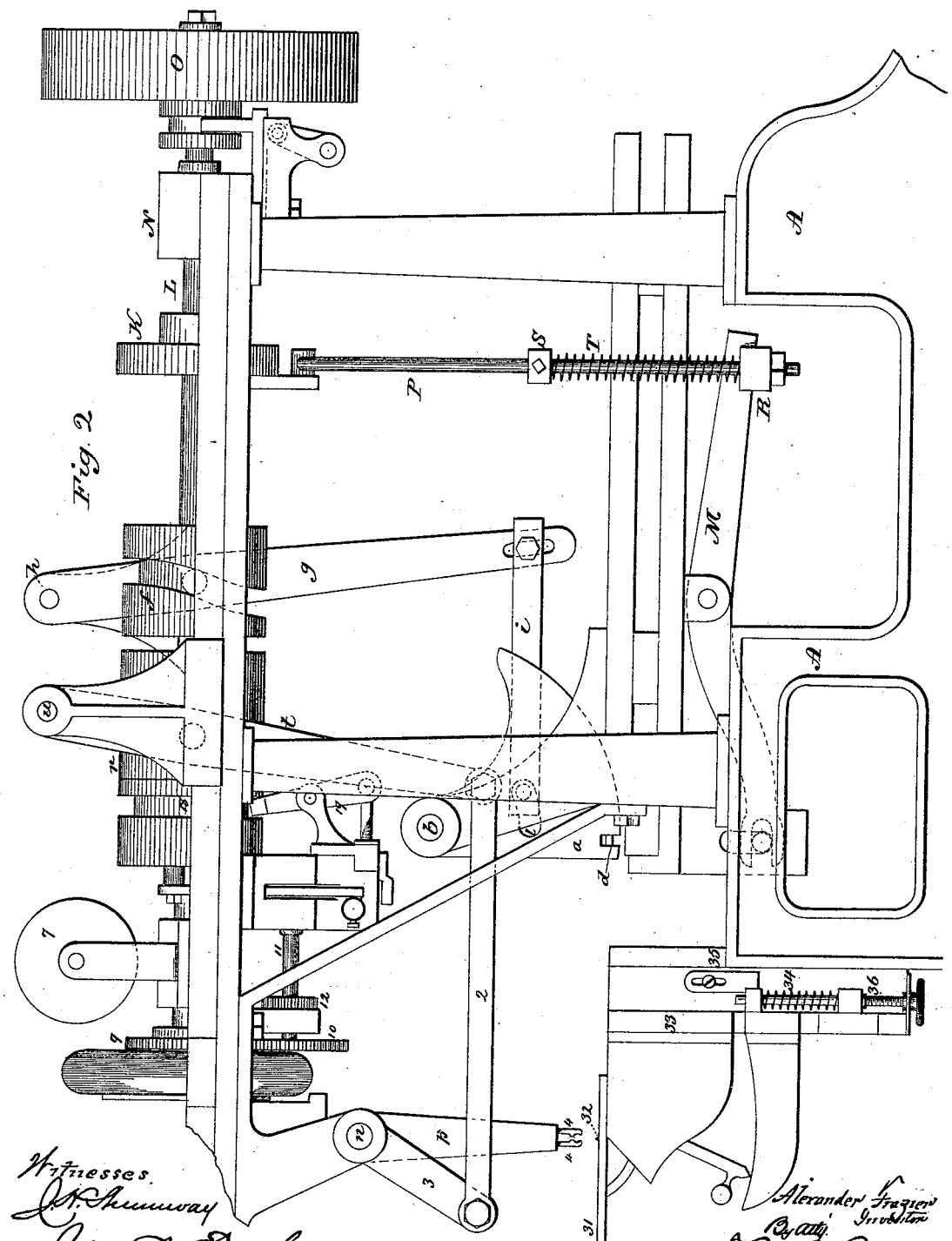

(No Model.)
A. FRAZIER.
MACHINE FOR MAKING BRUSHES.
No. 330,688. Patented Nov. 17, 1885.
5 Sheets—Sheet 3.
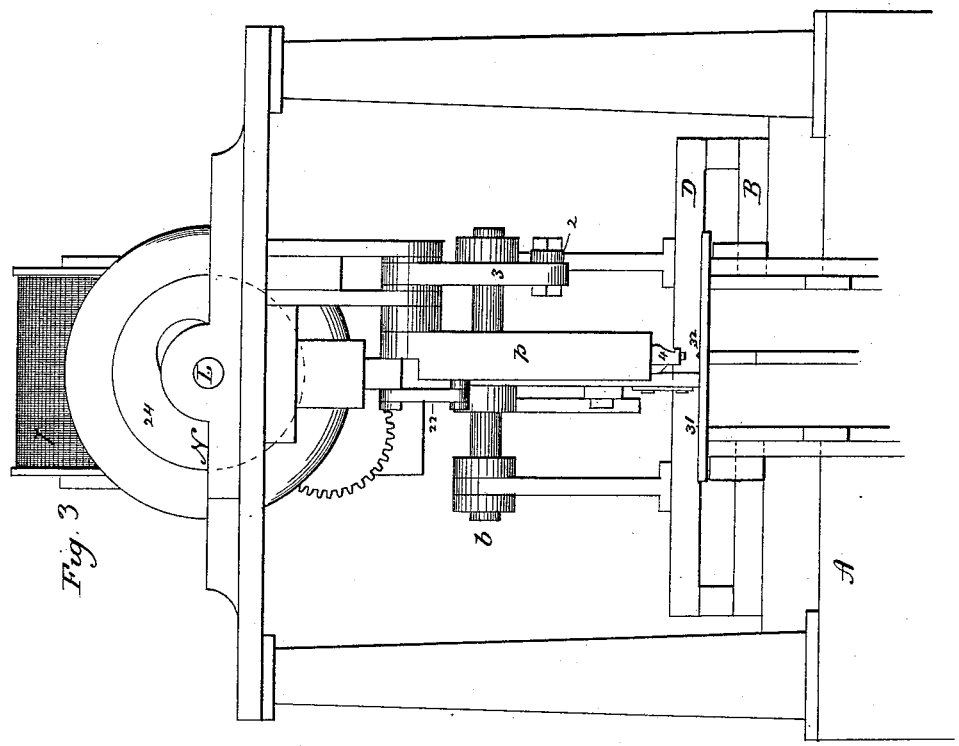
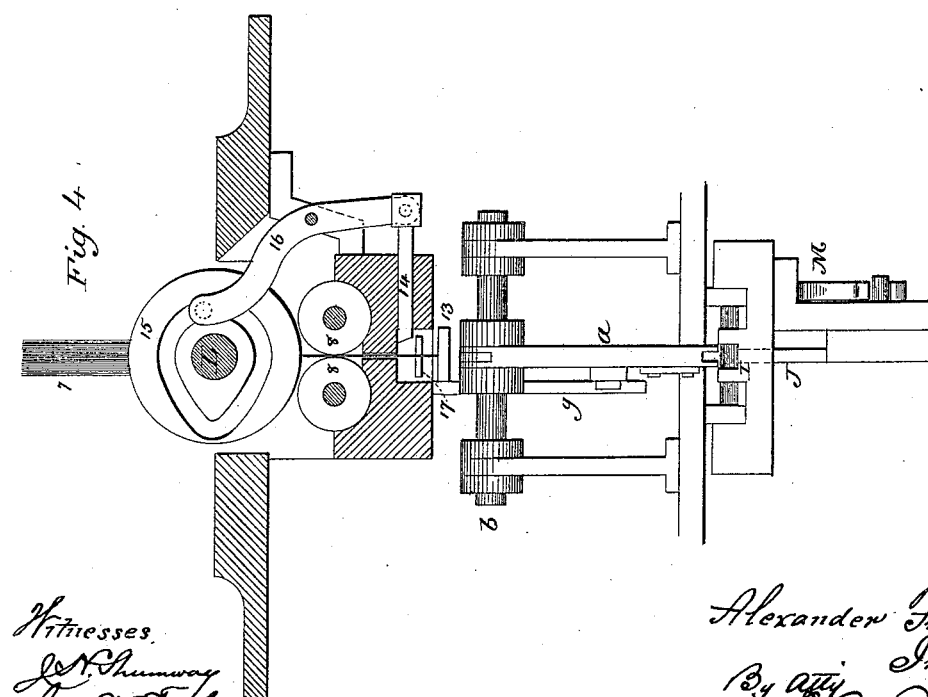

(No Model.) 5 Sheets—Sheet 4.
A. FRAZIER.
MACHINE FOR MAKING BRUSHES.
No. 330,688. Patented Nov. 17, 1885.
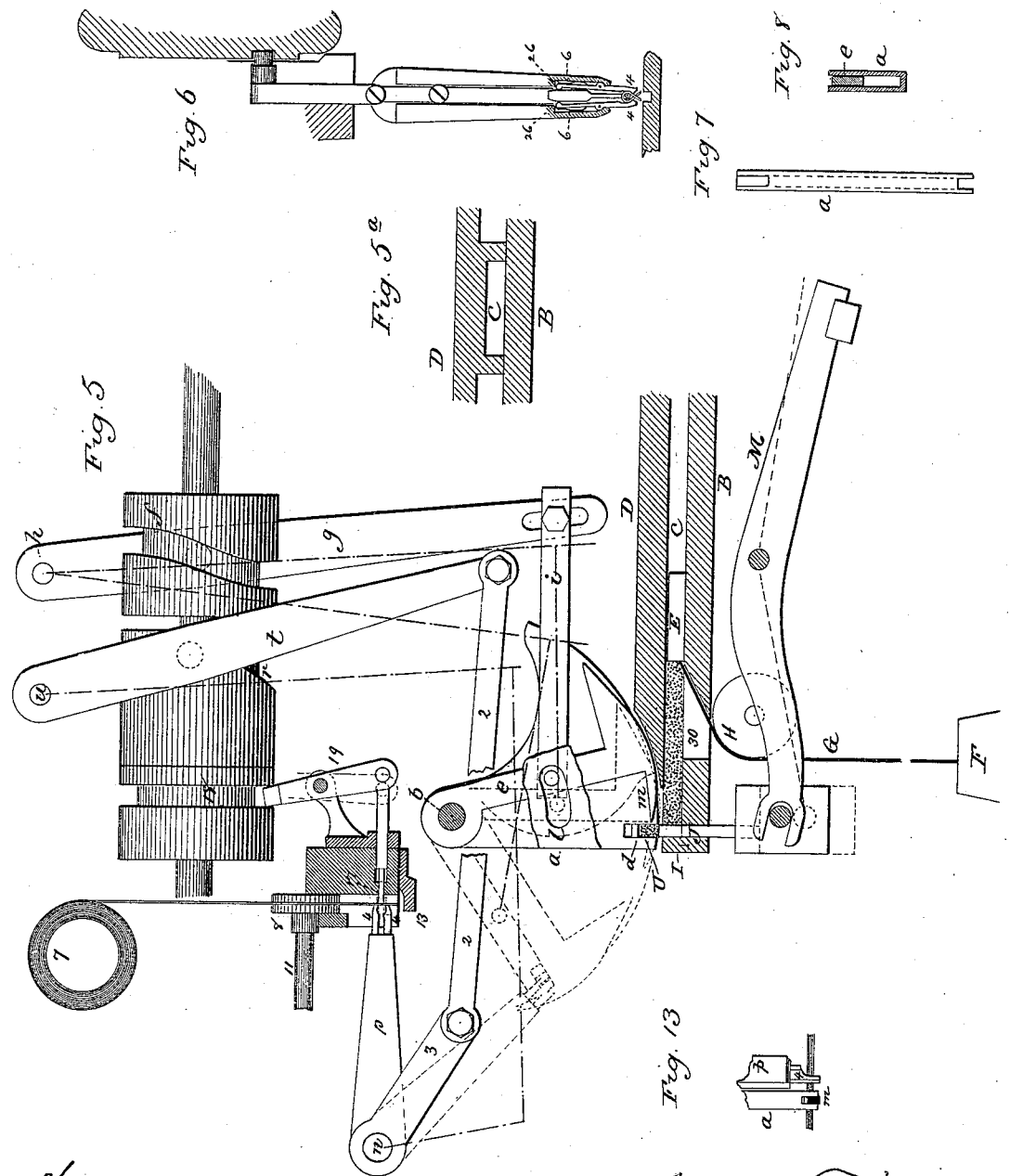
Witnesses,
J. H. Shumway
Jos. C. Earle
Alexander Frazier
Inventor
By atty (No Model.) 5 Sheets—Sheet 5.
A. FRAZIER.
MACHINE FOR MAKING BRUSHES.
No. 330,688. Patented Nov. 17, 1885.
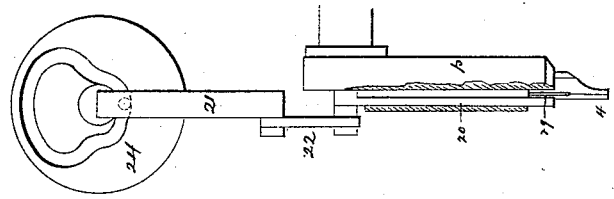
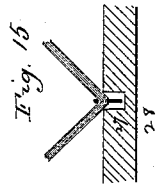
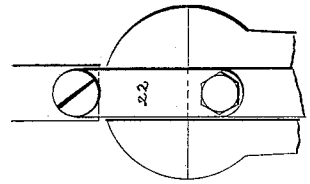
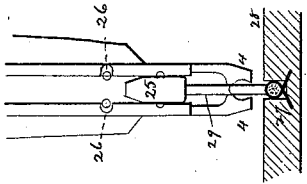
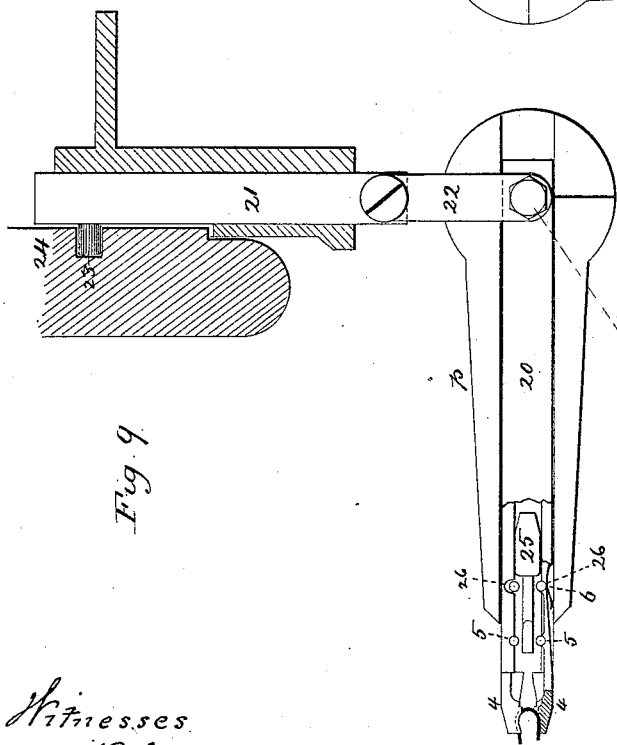
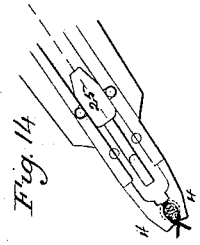
Witnesses
Alexander Frazier
Inventor
By atty

UNITED STATES PATENT OFFICE.

ALEXANDER FRAZIER, OF WEST HAVEN, CONNECTICUT, ASSIGNOR OF ONE-HALF TO CHARLES B. DELAPIERE, OF BROOKLYN, NEW YORK.

MACHINE FOR MAKING BRUSHES.

SPECIFICATION forming part of Letters Patent No. 330,688, dated November 17, 1885.

Application filed June 23, 1884. Serial No. 135,702. (No model.)

*To all whom it may concern:*

Be it known that I, ALEXANDER FRAZIER, of West Haven, in the county of New Haven and State of Connecticut, have invented a new Improvement in Machines for Making Brushes; and I do hereby declare the following, when taken in connection with accompanying drawings and the letters of reference marked thereon, to be a full, clear, and exact description of the same, and which said drawings constitute part of this specification, and represent, in—

Figure 1, a top view; Fig. 2, a side view; Fig. 3, a front end view; Fig. 4, a vertical section cutting in front of the wire-feed; Fig. 5, a sectional side view of the working parts of the machine; Fig. 5ª, a transverse section through the fiber-channel; Fig. 6, a vertical section through the tuft-setting arm; Fig. 7, a front view of the fiber-delivering arm *a;* Fig. 8, a transverse section through the arm *a* and through the separator-arm *e* in line of the connection between the two; Figs. 9, 10, 11, and 14, detached views of the tuft-setting arm, illustrating its operation; Fig. 12, a vertical section of the arm at right angles to Fig. 6; Fig. 13, a front view of the tuft-carrying arms *a e* and the tuft-setting arm *p*, showing them in the position of transferring the tuft from the arm *a* to the arm *p;* Fig. 15, a longitudinal section through the fibers as in the act of their insertion into the block.

This invention relates to an improvement in machines for setting the tufts in that class of brushes in which the fiber for the tuft is doubled, a staple placed around the tufts at the bend, the bend of the tuft and staple inserted into the hole in the block, and then the staple driven into the block as a means for securing the tuft in place—a class of brushes well known in the art.

The object of my invention is to simplify the machine which automatically gathers the requisite quantity of fiber for the tuft, forms the staple, places it about the fibers, doubles the fiber to form the tuft, then introduces the doubled end of the tuft and staple into the machine, and drives the staple into the wood; and in the mechanism whereby the object of my invention is attained, and as more fully hereinafter described, and particularly recited in the claims, my invention consists.

A represents the frame of the machine, upon which the operative mechanism is arranged; B, the bed, upon which is a longitudinal channel, C, in width corresponding to the length of the fiber from which the tufts are to be formed. This channel is covered by a plate, D, and may be formed therein as seen in Fig. 5ª, and so that the channel is substantially closed.

E is a follower arranged to move longitudinally in the channel, and caused to move forward by a weight, F, attached to the follower E by a cord, G, running over a pulley, H, as seen in Fig. 5, this weight and follower tending to move the mass of fibers in the channel forward whenever it is permitted so to move. The forward end of the channel is closed, as at I, Fig. 5, and at the extreme front end is a vertical slide, J, arranged to move up and down through the channel in suitable guides, such up and down movement being imparted by the cam K on the driving-shaft L through a lever, M, below the bed. The driving-shaft L is arranged in suitable bearings, N N, above the bed, and to which power is applied through a pulley, O, or otherwise, to impart rotation to the shaft. Between the cam K and the lever M is a connecting-rod, P. This rod extends down through a lug, R, on the lever M, and works freely therein. On the rod above the lug is an adjustable collar, S, and between the collar S and the lug R is a spring, T. As the cam K revolves it imparts a downward movement to the rod P at the proper time, and in which movement the collar S bears upon the spring T, and that upon the lug R, causing the lever M to turn and raise the slide J from the down position in broken lines to the position seen in solid lines, Fig. 5. In the upward movement of the slide J it raises the forward portion of the fibers from the channel, as seen at U, Fig. 5, there being an opening above the channel corresponding to the width of the slide J, and so that a certain quantity of fibers will be raised at each forward movement of the slide J. Above the opening in the bed through which the slide J raises the tufts is an arm, a, hung upon a rock-shaft, b. In the lower end of this arm is a recess, d, corresponding in width to the slide J and to the mass of fiber raised by the slide, the arm standing in the position seen in Fig. 5, so that as the fibers are raised by the slide J they pass directly into the recess d in the arm a. This arm is recessed upon its rear side. Its lower end is a segment of which the shaft b is the center, and, as seen in Fig. 5, so that as the arm is turned upon the rock-shaft as its center the segment-shaped surface of the lower end of the arm will pass over and cover the recess in the bed. In the recess of the arm a an arm, e, is hung (see Fig. 8) loose upon the shaft b, and so as to play in the recess of the arm a, with a certain independence of the arm a. Vibratory motion is imparted to the arm e by a cam, f, on the driving-shaft through a cam-lever, g, one end of which is hung upon a bearing, h, above the cam, the other arm connected to the arm e by a rod, i. The connection between the rod i and the arm e is made through a slot, l, in one side of the arm a. This slot is of such length that the arm a standing in the position seen in Fig. 5, the arm e may be drawn to the rear, as seen in Fig. 5. The lower end of the arm e is provided with a pointed separator, m, which, when the arm is in its rear position, stands just in rear of the mass of fibers which have been raised by the slide J, as seen in Fig. 5. In this position the cam f turns the arm e forward. The separator m passes through the mass of fibers and separates therefrom the requisite quantity for a single tuft, as seen in broken lines, Fig. 5. In this movement the back or under side of the separator acts as a cam upon the remaining portion of the fibers, and forces them, together with the slide J, down from the recess d in the lower end of the arm a, the spring T yielding for such downward movement. The requisite quantity of fibers for a single tuft is now held in the recess d by the separator m. At this time the connection or stud between the forward end of the rod i and the arm e has reached the forward end of the slot l. The cam f continuing its operation the arms a and e are moved forward and upward together into the position seen in Fig. 5, taking with them the fibers for a single tuft. Forward of and above the fiber-feeding device is a rock-shaft, n, which carries an arm, p. An oscillating movement is imparted to this rock-shaft by a cam, r, on the driving-shaft through a lever, t, hung at u, above the cam. A connecting-rod, 2, attached to the lower end of the lever t, is hung to the free end of an arm, 3, on the rock-shaft n. The movement imparted by the cam r is such as to turn the arm p from the position seen in Fig. 2 to that seen in Fig 5 and return. The arm p is shown enlarged in Fig. 9. In the lower end of this arm p a pair of jaws, 4 4, is hung upon pivots 5 5, the tails of the jaws extending toward the rock-shaft, each of the tails provided with a spring, 6, the tendency of which is to turn the tails toward each other and open the jaws, as seen in Fig 9. The arm p is first raised to the position seen in Fig. 5, and also as seen in Fig. 9. In that position the jaws receive the wire staple.

The staple is made from wire drawn from a reel, 7. The requisite quantity is drawn downward by a pair of feed-rolls, 8 8, to which a constant revolution is given from a gear, 9, on the driving-shaft working into a corresponding gear, 10, on the feed-shaft 11 of one of the rolls. Corresponding gears, 12, on the respective shafts of the rolls causes them to revolve in the direction to draw the wire downward. These rolls grasp the wire with sufficient friction to draw the wire, if the wire be free, but if the wire be stopped, then the rolls will slide upon the wire—a feeding device common and well known in wire-feeding apparatus. The wire fed by the rolls passes down directly across the mouth of the open jaws 4 4, as seen in Fig. 5. The end of the wire strikes a stop, 13, then the further feeding is arrested. At this time a cutter, 14, actuated by a cam, 15, through a lever, 16, (see Fig. 4,) is forced inward and cuts off the requisite length of wire for a single staple. This done, the bender 17, which stands across the line of wire and upon the side opposite the jaws, is forced forward by a cam, 18, acting through a lever, 19, and bends the blank which has been cut from the wire into U shape and forces it into the open jaws, as seen in broken lines, Fig. 5, thus forming the staple and delivering it into the jaws—the staple seen in the jaws in Fig. 9. The jaws having thus received the staple the bender 17 retreats, leaving the staple between the jaws 4 4. Then the cam r, acting through the lever t, turns the arm p downward into the position seen in Fig. 5, (broken lines,) where the arm stops, and this position is in the path of the ascending fibers held in the recess d of the arm a, and so that as the arm a rises, as before described, the fibers will pass between the jaws and into the open staple. The arm p swings in a plane to bring the jaws close up to one side of the arm a, as seen in Fig. 13, and so that the fibers freely enter between the jaws and into the open staple.

In the arm p is a slide, 20, arranged for movement in a radial direction from the center of vibration of the arm. This slide 20 is connected to a vertical slide, 21, by a link, 22. The slide 21 is provided with a transverse stud, 23, which works into a groove in the side of the cam 24, and so that an up and down movement will be imparted to the slide 21 at the predetermined required times. The slide 20 extends toward the jaws, and near its end is constructed with a cam-piece, 25, to pass between the tails of the jaws as the slide is moved downward. The ends of the tails of the jaws are bent inward or constructed with an inward projection, 26, as seen in Fig. 6, and so that as the cam-piece 25 passes between the tails it will force the jaw ends together, or escaping therefrom will permit the jaws to be opened by the action of their respective springs.

While the arm $p$ stands with the jaws upon the tuft, as before described, and as seen in Fig. 14, the cam 24, acting through the slide 21, imparts a downward movement to the slide 20 to bring the cam-piece 25 between the tails of the jaws, as seen in Fig. 14, which causes the jaws to grasp upon the fibers and at the same time bend the ends of the staples across each other around the bunch of fibers. After the fibers have been thus grasped the cam $r$ again acts and turns the arm $p$ down into its vertical position, as seen in Figs. 2 and 11, and directly over the hole 27 in the brush-block 28. Arrived at that position, the cam 24 again acts and imparts a downward movement to the slide 21, and a corresponding downward movement to the cam-piece 25, which carries the piece 25 below the ends of the tails of the jaws, so that the jaws may be permitted to open. Upon the lower end of the cam-piece 25 is a punch, 29, which, as the cam-piece passes below the tails of the jaws, strikes the staple and bunch of fiber and forces them together downward, the staple entering the hole, the fibers double across the hole, as seen in Fig. 15, the punch continuing its downward movement until the ends of the staple are driven into the block at the bottom of the hole, as seen in Fig. 10. Then the punch withdraws from the hole and fibers to its extreme up position, and so as to leave the jaws open. Then the arm $p$ is turned to its up position, a second staple introduced between the jaws, a second bunch of fibers taken by the arm $a$ and presented to the jaws, and so on. While the fibers are being set the arm $l$ is returned, taking with it the arm $a$, to their first position, and as seen in Fig. 5, where a second bunch of fibers is gathered preparatory to the next operation.

The bearings upon which the arm $a$ is hung are so close as to produce friction sufficient to prevent the movement of the arm except as under the influence of the moving arm $e$; hence as the arm $e$ begins its rear movement the arm $a$ will remain stationary until contact is made between the arm $e$ and the arm $a$ through the slot $l$, and then in the continued rear movement the arm $a$ is brought to its position to receive the next bunch of fibers.

The fibers are best introduced to the channel C by placing them in a pan in shape corresponding to the channel open at one end, then withdrawing the follower, introduce the pan into the open end of the channel, then holding the fibers at the rear, withdraw the pan, and replace the follower. The transverse section through the channel is seen in Fig. 5$^a$. The longitudinal slot 30 through the bed B is to permit the passage of the cord G, which connects the follower E with the weight F.

The parts of the machine are made adjustable to adapt them to different classes of work, or to vary the movement of the parts in the usual manner of making parts of similar machines adjustable.

Instead of the feed for the wire which I have described, any of the known wire-feeds may be employed.

31 represents the table upon which the block is placed for the introduction of the fibers, there being on the top of the table at the center a point, 32, which will enter a corresponding hole in the templet on which the block is placed, and so as to locate the block to present the hole for the reception of the tuft. Such a table is well known in brush-making machines. In setting the tufts into the block upon an unyielding table, which is the usual construction, if perchance one hole is not bored to the proper depth, great strain is brought upon the machine because of the resistance thereby produced for the full introduction of the tuft, the downward movement of the setting-punch being positive. Again, at some holes the wood will be so hard as to offer too great resistance for the complete driving in of the staple, and the staple itself must yield under the downward pressure of the punch. To obviate these difficulties, I arrange the table 31 on a vertical slide, 33, in the usual manner; but instead of making this slide fixed and positive in its position I arrange it to rest upon a spring or springs, 34, which is of sufficient strength to resist the setting of the tufts and staples in ordinary work; but should the strain upon the setting-punch become greater, as before described, then the springs 34 will yield under such increased pressure, but return the table to its proper level as soon as the punch is withdrawn. An adjustable stop, 35, is provided to limit and fix the normal level of the table. The power of the spring is adjusted by a screw, 36, so as to make the resistance to the downward pressure of the punch greater or less as may be required.

The feeding device whereby the requisite quantity of fibers is separated from the mass and delivered to the setting devices may be applied to other brush-making machines in which a different setting mechanism is employed. So also the tuft-setting mechanism herein described may be employed with other feeding or fiber-delivering mechanism. I therefore do not wish to be understood as limiting my invention to the combination of the particular feeding mechanism and the particular tuft-setting mechanism which I have described.

I claim—

1. In a machine for setting the tufts in brushes, the combination of a bed having a channel thereon arranged to receive a mass of fiber, a vibrating arm arranged to swing in a plane at right angles to the fiber lying in the channel, and constructed with a recess to receive a quantity of fibers from the channel, a slide arranged to deliver the said quantity of fiber from the channel to the recess in the arm, a separator arranged to move in a path at right angles to the fiber in said recess and pass between the fiber in the recess and the channel, whereby a predetermined quantity of fiber will be held in said recess, and mechanism, substantially such as described, to turn said arm and separator from their position over the channel into a position to meet the tuft-setting jaws, substantially as described.

2. In a machine for setting the tufts in brushes, the combination of a device, substantially such as described, to gather a predetermined quantity of fibers, a vibrating arm, a pair of jaws hung in said arm arranged to receive said predetermined quantity of fiber, a slide within said arm to close said jaws upon the fiber, and mechanism, substantially such as described, to actuate said slide and impart vibratory movement to said arm, substantially as specified.

3. In a machine for setting the tufts in brushes, the combination of a feed to present a predetermined quantity of fiber, a vibrating arm arranged to swing in a plane at right angles to the fibers so presented by the feed, a pair of jaws hinged in said arm, a slide movable in said arm and arranged to close or permit the opening of said jaws, a wire feeding and cutting-off mechanism, substantially such as described, arranged to deliver a staple-blank to the mouth of said jaws when presented thereto, a bender arranged to move at right angles to the blank and in line with the mouth of the jaws, and which by its movement doubles said blank, forms the staple, and forces it into said jaws, mechanism, substantially such as described, to impart swinging movement to said arm, to present said jaws and staple to the gathered fiber, and to close said jaws and staple thereon, and the slide within the arm provided with a punch to force said staple and fibers into the block when said arm is turned into position over the hole in the block, substantially as described.

4. In a machine for setting the tufts in brushes, the combination of a bed having a channel thereon arranged to receive a mass of fiber, the slide J, arranged to move across said channel at right angles to the fiber, the vibrating arm a, constructed with a recess, d, and which at one extreme of its movement stands over the slide J, and so as to receive the fiber delivered by the slide J, the vibrating arm e, hung upon the same center as the arm a, and provided with the separator m, and mechanism, substantially such as described, to impart vibratory movement to said arm e, whereby the separator first passes through the fiber in said recess and then engages the arm a to transfer the gathered fiber to the setting mechanism, substantially as described.

5. In a machine for setting the tufts in brushes, the combination of a bed having a channel thereon arranged to receive a mass of fiber, a follower within said channel to force the mass of fiber forward, the vertical slide J, arranged to work up and down through said channel, a vibrating arm, a, hung above the the channel and so as to swing in a plane at right angles to the fiber in the channel, constructed with a recess, d, into which the said slide J will force a quantity of fiber from the channel, a vibrating arm, e, hung upon the same center as the arm a, and so as to swing in the same plane, constructed with a separator, m, arranged to pass through the fiber in the said recess d, inclined upon its under side to force the fibers below its point from the recess as it passes through it, mechanism, substantially such as described, to impart vibratory movement first to the arm e to introduce the separator and then turn the two arms together, and a mechanism, substantially such as described, to receive and take the fibers from said recess d to form the tuft, substantially as described.

6. In a machine for setting the tufts in brushes, the combination of the bed having the channel C thereon, follower E, vertical slide J, vibrating arm a, constructed with a recess, d, the arm e, provided with the separator m, the arm p, jaws 4 4, hung in said arm, slide 20, carrying the cam-piece 25 and punch 29, the staple-bender 17, and mechanism to present a wire blank to said bender, and mechanism, substantially such as described, to impart a vibratory movement to said arms e a and to said arm p and to the slide 20, substantially as specified.

ALEXANDER FRAZIER.

Witnesses:
JOHN E. EARLE,
JOS. C. EARLE.